United States Patent
Hayashi et al.

(10) Patent No.: US 12,444,142 B2
(45) Date of Patent: Oct. 14, 2025

(54) POSITIONING SYSTEM TO POSITION A TERMINAL CARRIED BY A USER IN A VEHICLE

(71) Applicant: NTT DOCOMO, INC., Chiyoda-ku (JP)

(72) Inventors: Kouki Hayashi, Chiyoda-ku (JP); Taishi Yamamoto, Chiyoda-ku (JP); Shinji Kimura, Chiyoda-ku (JP); Mikio Iwamura, Chiyoda-ku (JP); Osamu Goto, Chiyoda-ku (JP); Eriko Oseki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 503 days.

(21) Appl. No.: 17/906,307

(22) PCT Filed: Mar. 3, 2021

(86) PCT No.: PCT/JP2021/008265
§ 371 (c)(1),
(2) Date: Sep. 14, 2022

(87) PCT Pub. No.: WO2021/192873
PCT Pub. Date: Sep. 30, 2021

(65) Prior Publication Data
US 2023/0351703 A1   Nov. 2, 2023

(30) Foreign Application Priority Data
Mar. 27, 2020  (JP) ................. 2020-057634

(51) Int. Cl.
G06T 19/00   (2011.01)
G01C 21/30   (2006.01)
G06T 7/11    (2017.01)

(52) U.S. Cl.
CPC ............ *G06T 19/006* (2013.01); *G01C 21/30* (2013.01); *G06T 7/11* (2017.01); *G06T 2207/30252* (2013.01); *G06T 2207/30268* (2013.01)

(58) Field of Classification Search
CPC ..................... G06T 19/006; G06T 7/11; G06T 2207/30252; G06T 2207/30268;
(Continued)

(56) References Cited

U.S. PATENT DOCUMENTS 9,550,419 B2 * 1/2017 Habashima ............ B60K 35/60
9,727,580 B2 * 8/2017 Oi ............................ G06F 16/51
(Continued)

FOREIGN PATENT DOCUMENTS

EP      3456574 A1 *  3/2019  .......... G02B 27/017
JP      2015-69362 A    4/2015
JP      2015069362 A *  4/2015

OTHER PUBLICATIONS

International Preliminary Report on Patentability issued on Oct. 6, 2022 in PCT/JP2021/008265 filed on Mar. 3, 2021 (submitting English translation only), 5 pages.
(Continued)

*Primary Examiner* — Richard A Hansell, Jr.
(74) *Attorney, Agent, or Firm* — Oblon, McClelland, Maier & Neustadt, L.L.P.

(57) ABSTRACT

A positioning system includes a first storage unit that stores global map data in which image data outside a vehicle is associated with global position information and local map data in which image data inside the vehicle is associated with local position information, a division unit that divides image data into an image area outside the vehicle and an image area inside the vehicle, a global position estimation unit that performs matching of the global map data with the
(Continued)

image area outside the vehicle, and estimates global position information, and a local position estimation unit that performs matching of the local map data with the image area inside the vehicle and estimates local position information.

10 Claims, 4 Drawing Sheets

(58) Field of Classification Search
CPC .. G06T 7/00; G06T 7/70; G06T 11/60; G01C 21/30; G01B 11/00; G01S 19/48
See application file for complete search history.

(56) References Cited

U.S. PATENT DOCUMENTS

| | | | |
|---|---|---|---|
| 11,906,970 B2* | 2/2024 | Suzuki | G01C 21/206 |
| 2013/0162639 A1* | 6/2013 | Muench | A63F 13/655 |
| | | | 345/419 |
| 2019/0384383 A1* | 12/2019 | Lee | G06F 3/011 |
| 2022/0365741 A1* | 11/2022 | Yuki | G06F 3/011 |

OTHER PUBLICATIONS

International Search Report issued Apr. 20, 2021, in PCT/JP2021/008265 filed Mar. 3, 2021, 2 pages.

* cited by examiner

POSITIONING SYSTEM TO POSITION A TERMINAL CARRIED BY A USER IN A VEHICLE

TECHNICAL FIELD

An aspect of the present invention relates to a positioning system.

BACKGROUND ART

A technology for performing augmented reality display according to a position of a terminal carried by a user is known (see, for example, Patent Document 1). Such a terminal performs self-position recognition on the basis of, for example, an image from a camera of the terminal itself and a sensing result of a gyro sensor, acceleration sensor, or the like that has been mounted, and displays augmented reality (AR) content according to a recognized self-position.

CITATION LIST

Patent Literature

[Patent Literature 1] Japanese Unexamined Patent Publication No. 2015-069362

SUMMARY OF INVENTION

Technical Problem

Here, for example, a case in which a camera of a terminal is imaging the inside of a vehicle such as a train or a car when a user holding the terminal is moving by the vehicle is considered. In this case, in self-position recognition using a sensing result of the gyro sensor or the acceleration sensor of the terminal, it is recognized that the terminal is moving at a moving speed of the vehicle. On the other hand, in the self-position recognition using an imaging result of the camera of the terminal, because a result of imaging the inside the vehicle does not greatly change even when the vehicle is moving, it is recognized that the terminal does not move (or slightly moves) on the basis of an image of the inside of the vehicle. When the self-position recognition results that contradict each other are acquired in this way, there is concern that it cannot determine which of the self-position recognition results is correct as a self-position outside the vehicle or a self-position inside the vehicle at the terminal.

Such a problem can also occur, for example, when the self-position recognition is performed on the basis of only the imaging result of the camera of the terminal. That is, when the camera of the terminal is imaging the outside of the vehicle and the inside of the vehicle, a self-position recognition result based on a result of imaging the outside the vehicle and a self-position recognition result based on a result of imaging the inside the vehicle of are obtained as self-position recognition results, there is concern that it cannot determine which of the self-position recognition results is correct as a self-position outside the vehicle or a self-position inside the vehicle at the terminal.

An aspect of the present invention has been made in view of the above circumstances, and an object of the present invention is to appropriately estimate position information for each area when a plurality of different self-position recognition results can be obtained for positioning of a terminal carried by a user in a vehicle.

Solution to Problem

A positioning system according to an aspect of the present invention is a positioning system related to positioning of a terminal carried by a user in a vehicle, the positioning system including: a first storage unit configured to store global map data in which a feature quantity of a feature point included in image data outside a vehicle captured in advance is associated with global position information related to the feature point, and local map data in which a feature quantity of a feature point included in image data inside the vehicle captured in advance is associated with local position information related to the feature point; a division unit configured to divide image data captured in the terminal into an image area outside the vehicle and an image area inside the vehicle; a global position estimation unit configured to perform matching of the feature point of the global map data stored in the first storage unit with the feature point of the image area outside the vehicle, and estimate global position information related to the image area outside the vehicle on the basis of the global position information related to the feature point of the global map data; and a local position estimation unit configured to perform matching of the feature point of the local map data stored in the first storage unit with the feature point of the image area inside the vehicle, and estimate local position information related to the image area inside the vehicle on the basis of the local position information related to the feature point of the local map data.

In the positioning system according to an aspect of the present invention, the global map data in which the feature quantity of the feature point included in the image data outside the vehicle is associated with the global position information related to the feature point, and the local map data in which the feature quantity of the feature point included in the image inside the vehicle is associated with the local position information related to the feature point are stored. In the positioning system according to one aspect of the present embodiment, the image data captured in the terminal is divided into the image area outside the vehicle and the image area inside the vehicle, matching of the feature point of the global map data with the feature point of the image area outside the vehicle is performed, and matching of the feature point of the local map data with the feature point of the image area inside the vehicle is performed. Thus, the image data is divided into the image area outside the vehicle and the image area inside the vehicle, the global position information is estimated from the global map data for the image area outside the vehicle, and the local position information is estimated from the local map data for the image area inside the vehicle, so that the position information is estimated in association with the respective areas even when both the outside of the vehicle and the inside of the vehicle are imaged and a plurality of self-position recognition results are obtained. This makes it possible to appropriately estimate position information for each area when a plurality of different self-position recognition results can be obtained for the positioning of the terminal carried by the user in the vehicle.

Advantageous Effects of Invention

According to an aspect of the present invention, it is possible to appropriately estimate position information for each area when a plurality of different self-position recognition results can be obtained for the positioning of a terminal carried by a user in a vehicle.

DESCRIPTION OF EMBODIMENTS

Figure 1:
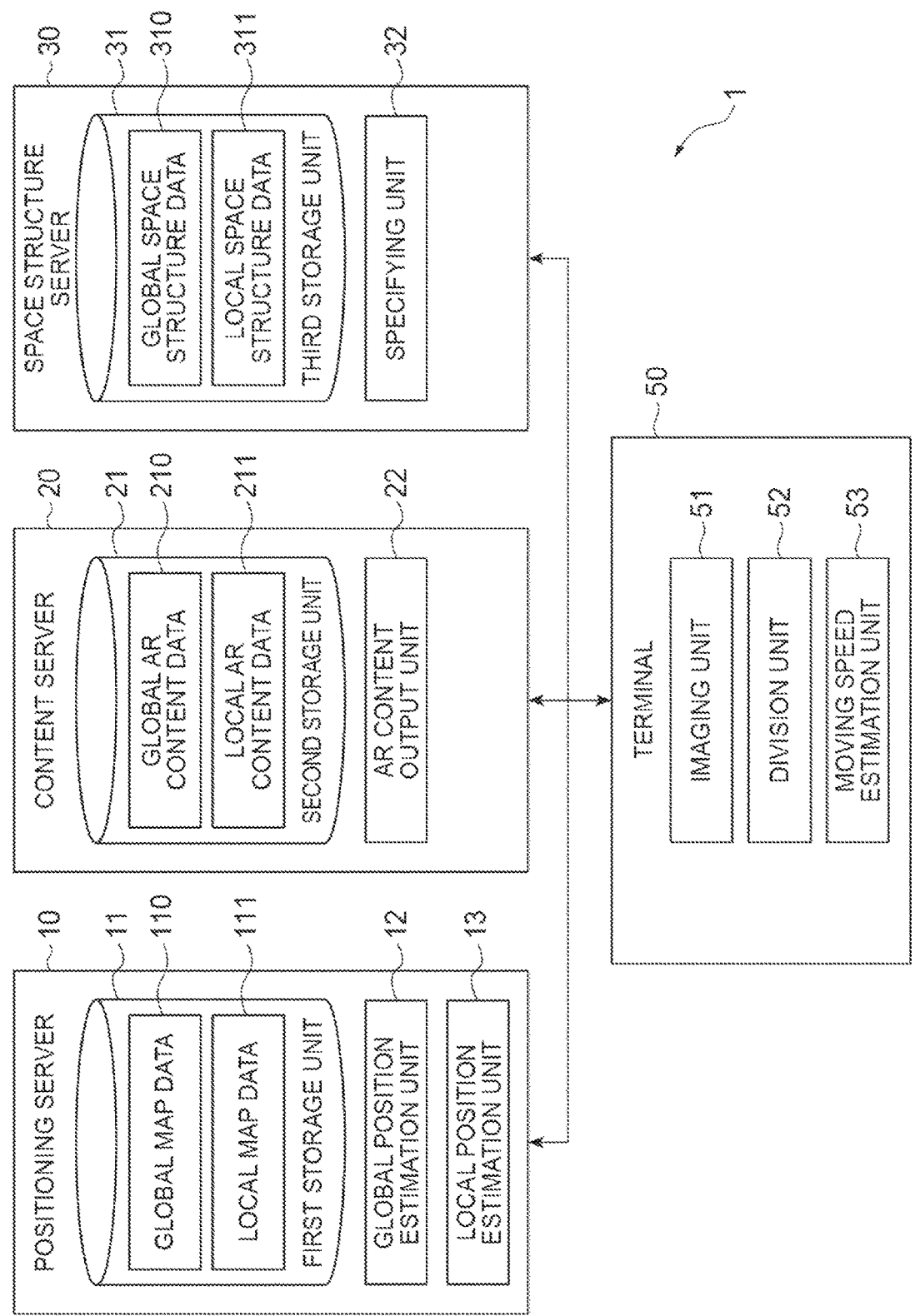
FIG. 1 is a block diagram illustrating a functional configuration of a positioning system according to the present embodiment.

Hereinafter, embodiments of the present invention will be described in detail with reference to the accompanying drawings. In description of the drawings, the same or equivalent elements are denoted by the same reference numerals, and repeated description is omitted.

FIG. 1 is a block diagram illustrating a functional configuration of a positioning system 1 according to the present embodiment. The positioning system 1 illustrated in FIG. 1 is a positioning system that performs positioning on the basis of image data captured by a terminal 50. The positioning system 1 is, for example, a system that performs positioning of the terminal 50 in a service that provides AR content according to a positioning result (a position of the terminal 50). Hereinafter, a case in which the positioning system 1 is a system related to a service that provides AR content will be described, but the positioning system 1 may be a system related to other uses. The positioning system 1 includes a positioning server 10, a content server 20, a space structure server 30, and a terminal 50. In the positioning system 1, for example, the positioning server 10, the content server 20, the space structure server 30, and the terminal 50 can be communicatively connected to each other. Although only one terminal 50 is illustrated in FIG. 1, a plurality of terminals 50 may actually be included.

The terminal 50 is, for example, a terminal capable of wireless communication, such as a smartphone, a tablet terminal, or a PC. The terminal 50 includes an imaging unit 51, a division unit 52, and a moving speed estimation unit 53 as functional components.

The imaging unit 51 images surroundings of the terminal 50 by controlling a camera mounted on the terminal 50. The imaging unit 51 continuously executes imaging, for example, when an application related to AR content is executed.

The division unit 52 divides the image data obtained by imaging into an image area outside the vehicle and an image area inside the vehicle. The image area outside the vehicle is, for example, an area of an image that can be seen through a window from the inside of the vehicle. The division unit 52 may estimate a meaning of each pixel in the image data (a meaning considering information on surrounding pixels) through, for example, semantic segmentation, and categorize (give a meaning to) each area on the basis of a result of the estimation. For example, the division unit 52 estimates whether respective pixels of the image data are pixels indicating the outside of the vehicle or pixels indicating the inside of the vehicle, and gives a meaning to each area to divide the image data into the image area outside the vehicle and the image area inside the vehicle. The pixels indicating the outside of the vehicle are, for example, pixels related to a road, a railroad, a building, or the like, and the pixels indicating the inside of the vehicle are, for example, pixels related to a vehicle window, a vehicle wall, a floor, a ceiling, a seat, or the like. The division unit 52, for example, may recognize a vehicle window through image recognition, set an inner side of the vehicle window as the image area outside the vehicle, and set another area as the image area inside the vehicle to divide the image area. The division unit 52 transmits the image data divided into the image area outside the vehicle and the image area inside the vehicle (hereinafter referred to as "divided image data") to the positioning server 10. The division unit 52 may change a frequency at which the divided image data is transmitted to the positioning server 10 according to a moving speed (details will be described below) of the vehicle estimated by the moving speed estimation unit 53. The division unit 52 may increase a transmission frequency of the divided image data as the moving speed estimated by the moving speed estimation unit 53 is higher. On the other hand, the terminal 50 may decrease the transmission frequency of the divided image data as the moving speed estimated by the moving speed estimation unit 53 is lower.

The moving speed estimation unit 53 estimates a moving speed of a vehicle that the user carrying the terminal 50 is aboard. The moving speed estimation unit 53 estimates the moving speed of the vehicle on the basis of, for example, a change in position obtained by an acceleration sensor or image recognition. A method of estimating the moving speed in the moving speed estimation unit 53 is not limited thereto. Further, the moving speed estimation unit 53 may detect that the user is moving by a vehicle such as a train or a car, on the basis of whether the estimated speed is equal to or higher than a certain speed.

The positioning server 10 is a server that estimates the position information of the terminal 50 at the time of imaging on the basis of the image data captured in the terminal 50. The positioning server 10 includes a first storage unit 11, a global position estimation unit 12, and a local position estimation unit 13 as functional components.

The first storage unit 11 stores global map data 110 in which a feature quantity (for example, a luminance direction vector) of a feature point included in image data outside the vehicle captured in advance is associated with global position information related to the feature point. Such global map data 110 is generated on the basis of a large amount of image data captured in advance by, for example, a stereo camera (not illustrated) capable of simultaneously imaging an object in a plurality of different directions. The feature point is a point that is conspicuously detected in the image, and is, for example, a point at which luminance (intensity) is high (or small) as compared with other areas. The global position information is three-dimensional position information outside the vehicle. The global position information related to the feature point is global position information in a real space for an area indicated by the feature point in the image.

Further, the first storage unit 11 stores local map data 111 in which a feature quantity of a feature point included in the image data inside the vehicle captured in advance and the local position information that is the position information related to the feature point are associated with each other. The local map data 111 is generated by the same scheme as that for the global map data 110. The local position information is three-dimensional position information inside the vehicle. The local position information may be stored, for example, for each type of vehicle or for each vehicle alone. The local position information related to the feature point is local position information in the real space for an area indicated by a feature point in an image.

The first storage unit 11 stores three-dimensional position information as position information related to a feature point of the global map data 110 and the local map data 111. The first storage unit 11 stores, for example, a latitude, longitude, and height of the feature point as the three-dimensional position information related to the feature point.

The global position estimation unit 12 estimates the global position information related to the image area outside the vehicle at the time of imaging on the basis of the image area outside the vehicle in the divided image data and the global map data 110 stored in the first storage unit 11. For example, the global position estimation unit 12 performs matching of the feature point of the global map data 110 with the feature point of the image area outside the vehicle in the divided image data, and specifies an area of the global map data 110 corresponding to the image area outside the vehicle. The global position estimation unit 12 estimates the global position information related to the image area outside the vehicle at the time of imaging, on the basis of the global position information related to the feature point of the global map data 110 related to the specified area. The global position estimation unit 12 transmits the estimated global position information to the terminal 50.

The local position estimation unit 13 estimates local position information related to the image area inside the vehicle at the time of imaging on the basis of the image area inside the vehicle in the divided image data and the local map data 111 stored in the first storage unit 11. For example, the local position estimation unit 13 performs matching of the feature point of the local map data 111 with the feature point of the image area inside the vehicle in the divided image data, and specifies the area of the local map data 111 corresponding to the image area inside the vehicle. The local position estimation unit 13 estimates the local position information related to the image area inside the vehicle at the time of imaging on the basis of the local position information related to the feature point of the local map data 111 related to the specified area. The local position estimation unit 13 transmits the estimated local position information to the terminal 50.

The content server 20 is a server that outputs AR content according to the global position information and the local position information transmitted from the terminal 50. The content server 20 includes a second storage unit 21 and an AR content output unit 22 as functional components.

The second storage unit 21 stores global AR content data 210 in which global position information outside the vehicle is associated with AR content, and local AR content data 211 in which local position information inside the vehicle is associated with the AR content.

The AR content output unit 22 specifies the AR content according to the global position information on the basis of the global position information estimated by the global position estimation unit 12 and the global AR content data 210, and outputs the AR content. Further, the AR content output unit 22 specifies the AR content according to the local position information on the basis of the local position information estimated by the local position estimation unit 13 and the local AR content data 211, and outputs the AR content.

The AR content output unit 22 may determine the display aspect of the AR content according to the global position information in consideration of a shape of the object in the global space structure data 310 to be described below. For example, the AR content output unit 22 may determine a display position of the AR content so that signboards of buildings are not blocked, may determine a size of the AR content so that the AR content does not overlap with other buildings or the like, or may determine an angle of the AR content along an outer wall of a building. Further, the AR content output unit 22 may determine the display aspect of the AR content according to the local position information in consideration of the shape of the object in the local space structure data 311 to be described below. For example, the AR content output unit 22 may determine the display position of the AR content so that the AR content is along an upper part of a seat, may determine the size of the AR content so that the AR content matches a width of the upper part of the seat, or may determine the angle of the AR content so that the AR content matches an angle of the seat.

The space structure server 30 is a server that specifies space structure data according to the global position information and space structure data according to the local position information on the basis of the global position information and the local position information transmitted from the terminal 50. The space structure server 30 transmits the specified space structure data to the content server 20. The space structure server 30 includes a third storage unit 31 and a specifying unit 32 as functional components.

The third storage unit 31 stores the global space structure data 310 indicating the shape of the object in a space outside the vehicle and the local space structure data 311 indicating the shape of the object in the space inside the vehicle. Specifically, the global space structure data 310 is data representing the shape of the object in a position in a three-dimensional virtual space corresponding to a position (global position information) of the object in a real space outside the vehicle. Specifically, the local space structure data 311 is data representing the shape of the object at the position in a three-dimensional virtual space corresponding to the position (local position information) of the object in the real space inside the vehicle.

In the global space structure data 310, for example, when there are a plurality of buildings in the real space outside the vehicle, objects on the ground and objects of the plurality of buildings disposed at the same positions as the real space outside the vehicle are represented in the virtual space. In the local space structure data 311, for example, when there is a seat in the real space inside the vehicle, a car wall object, a floor object, a ceiling object, and a seat object disposed at the same positions as those in the real space inside the vehicle are represented in the space structure data of the virtual space corresponding to the real space inside the vehicle. That is, the objects in the global space structure data 310 and the local space structure data 311 are linked to objects in the real space. The global space structure data 310 and the local space structure data 311 may be data representing a shape of only a static object (basically, an object that does not move). Further, the objects of the global space structure data 310 and the local space structure data 311 may include objects that are not linked to the objects in the real space.

The specifying unit 32 specifies the space structure data according to the global position information on the basis of the global position information transmitted from the terminal 50 and the global space structure data 310 stored in the third storage unit 31. The space structure data according to the global position information is, for example, space structure data corresponding to an area within a predetermined range from a position indicated by the global position information. Further, the specifying unit 32 specifies the space structure data according to the local position information on the basis of the local position information transmitted from the terminal 50 and the local space structure data 311 stored in the third storage unit 31. The space structure data according to the local position information is, for example, space structure data corresponding to the area within the predetermined range from a position indicated by the local position information. The specifying unit 32 transmits the space structure data according to the global position information and the space structure data according to the local position information to the content server 20. The space structure data may be transmitted to the content server 20 via the terminal 50.

Figure 2:
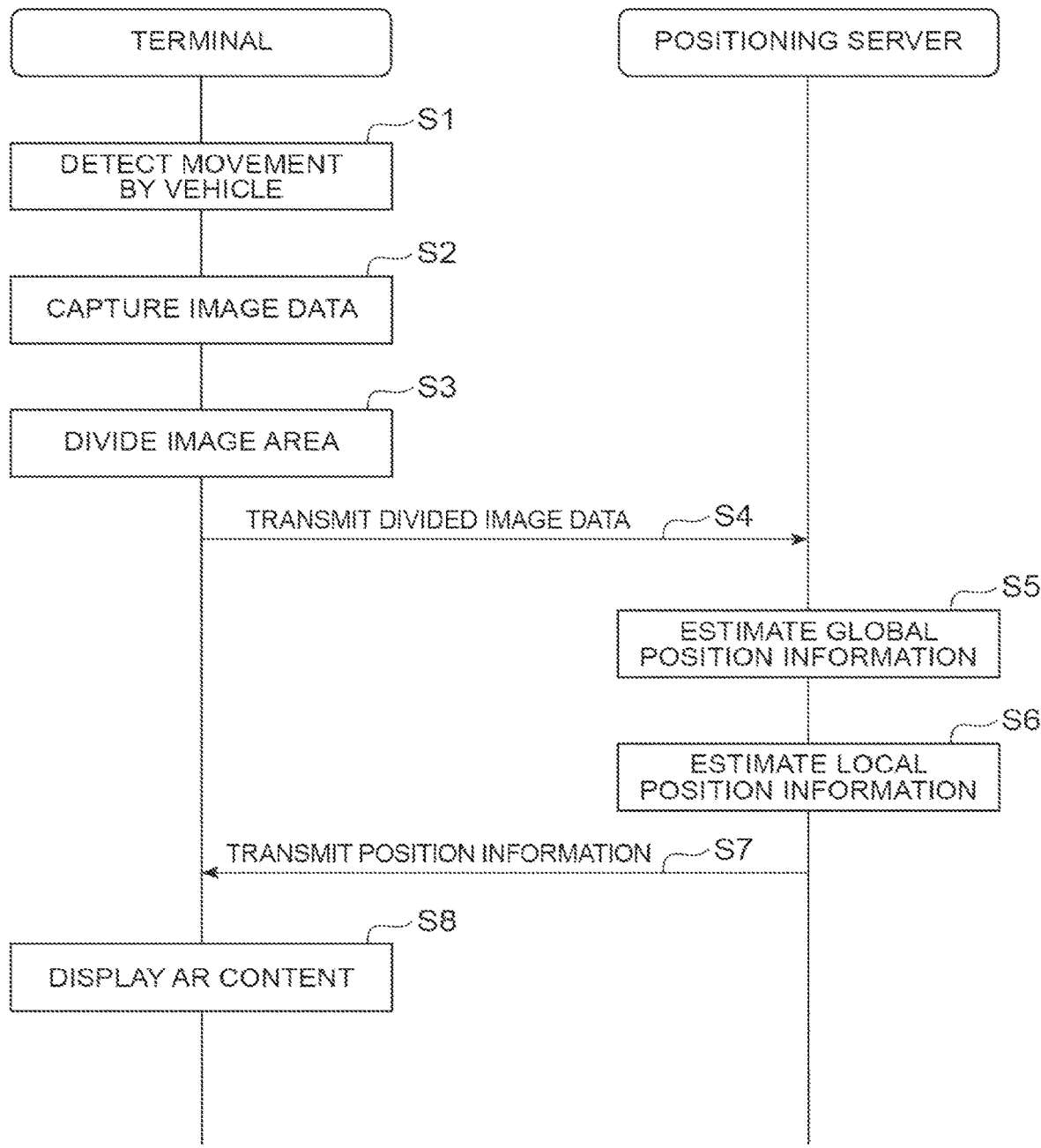
FIG. 2 is a sequence diagram illustrating processing that is performed by the positioning system.

Next, processing performed by the positioning system 1 will be described with reference to FIG. 2. FIG. 2 is a sequence diagram illustrating processing that is performed by the positioning system 1.

The terminal 50 detects that the user is moving by the vehicle such as a train or a car on the basis of whether the estimated speed is equal to or higher than a certain speed (step S1).

The terminal 50 starts capturing image data (step S2).

The terminal 50 divides the image data obtained by imaging into the image area outside the vehicle and the image area inside the vehicle, and acquires the divided image data (step S3). The terminal 50 may estimate the meaning of each pixel in the image data through, for example, semantic segmentation, and categorize each area on the basis of a result of the estimation. The terminal 50 estimates, for example, whether each pixel is the pixel indicating the outside of the vehicle or the pixel indicating the inside of the vehicle and gives a meaning to each area to divide the image data into the image area outside the vehicle and the image area inside the vehicle. The terminal 50 may divide the image data obtained by imaging into the image area outside the vehicle and the image area inside the vehicle only when the estimated moving speed is higher than a predetermined division start speed (for example, 10 km/h). The division start speed is a threshold value for determining whether or not an image area of the image data obtained by imaging is to be divided.

The terminal 50 transmits the divided image data to the positioning server 10 (step S4). The terminal 50 may change a frequency at which the terminal 50 transmits the divided image data to the positioning server 10 according to the estimated moving speed of the vehicle. The terminal 50 may increase the transmission frequency of the divided image data as the estimated moving speed is higher. When the transmission frequency of the divided image data becomes high, the positioning server 10 may increase an estimation frequency of the global position information. On the other hand, the terminal 50 may decrease the transmission frequency of the divided image data as the estimated moving speed is lower. When the transmission frequency of the divided image data becomes low, the positioning server 10 may decrease the estimation frequency of the global position information.

The positioning server 10 estimates the global position information related to the image area outside the vehicle at the time of imaging on the basis of the image area outside the vehicle in the divided image data and the global map data 110 (step S5). For example, the positioning server 10 performs matching of the feature point of the global map data 110 with the feature point of the image area outside the vehicle in the divided image data, and specifies the area of the global map data 110 corresponding to the image area outside the vehicle. The positioning server 10 estimates the global position information related to the image area outside the vehicle at the time of imaging, on the basis of the global position information related to the feature point of the global map data 110 related to the specified area.

The positioning server 10 estimates the local position information related to the image area inside the vehicle at the time of imaging on the basis of the image area inside the vehicle in the divided image data and the local map data 111 (step S6). For example, the positioning server 10 performs matching of the feature point of the local map data 111 with the feature point of the image area inside the vehicle in the divided image data, and specifies the area of the local map data 111 corresponding to the image area inside the vehicle. The positioning server 10 estimates the local position information related to the image area inside the vehicle at the time of imaging on the basis of the local position information related to the feature point of the local map data 111 related to the specified area.

The positioning server 10 transmits the estimated global position information and the local position intonation to the terminal 50 (step S7).

The terminal 50 receives the AR content from the content server 20 on the basis of the global position information and the local position information estimated by the positioning server 10, the captured image data, the information (an angle of view, and the like) on the camera of the terminal 50, and the like, and displays the AR content (step S8). Specifically, the terminal 50 transmits the global position information and the local position information to the content server 20. The content server 20 specifies the AR content according to the global position information on the basis of the global position information and the global AR content data 210 and outputs the AR content, and specifies the AR content according to the local position information on the basis of the local position information and the local AR content data 211 and outputs the AR content. The terminal 50 displays the AR content using the AR content, the captured image data, information (an angle of view, and the like) on the camera of the terminal 50, and the like. Further, the content server 20 may determine the display aspect of the AR content according to the global position information in consideration of the shape of the object in the global space structure data 310, and also determine the display aspect of the AR content according to the local position information in consideration of the shape of the object in the local space structure data 311.

Figure 3:
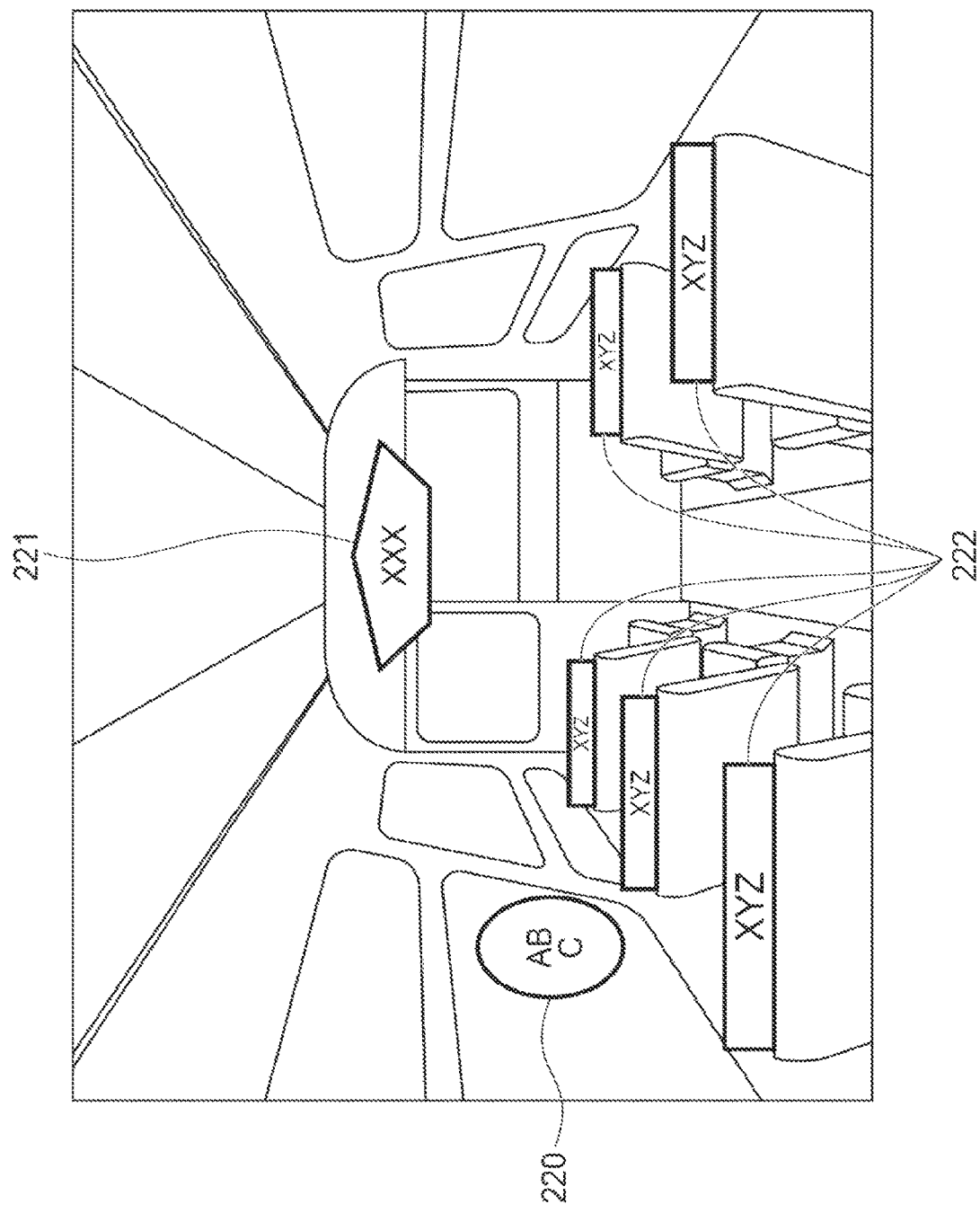
FIG. 3 is a diagram illustrating a display example of AR content of the positioning system according to the present embodiment.

FIG. 3 is a diagram illustrating a display example of the AR content of the positioning system 1 according to the present embodiment. FIG. 3 illustrates an example in which AR content is displayed on the terminal 50 when the user carrying the terminal 50 is on a bus.

It is shown that AR content 220 is AR content outside the vehicle based on the global position information, and is displayed inside the area of the vehicle window (window frame). When the global position information is changed due to a movement of the bus, a display position of the AR content 220 may be changed. For example, when the bus moves forward, the display position may be changed so that the AR content 220 moves backward with respect to a traveling direction, or the AR content 220 may be hidden.

It is shown that AR contents 221 and 222 are AR contents inside the vehicle based on the local position information, and are displayed inside the bus. When the local position information is changed by the terminal 50 moving inside the vehicle (for example, a seat is changed), display positions of the AR contents 221 and 222 may be changed.

The AR contents 220, 221, and 222 illustrated in FIG. 3 may be displayed on the basis of the space structure data. For example, the AR content 220 may be displayed at a position considering a shape of an object (a building or the like) outside the vehicle further on the basis of the space structure data according to the global position information. The position considering the shape can be, for example, a position at which the AR content 220 does not block a signboard of the building, but the present invention is not limited thereto. For example, the AR content 220 may be displayed in a size in which the AR content 220 does not overlap with other buildings or the like, or may be displayed at an angle along an outer wall of the building. Further, for example, the AR contents 221 and 222 may be displayed at a position considering the shape of the object inside the vehicle further on the basis of the space structure data according to the local position information. For example, the AR content 222 may be displayed at a position along an upper part of a seat in consideration of a shape of the seat. Further, for example, the AR content 222 may be displayed in a size considering a width of the upper part of the seat, or may be displayed at an angle according to an angle of the seat.

Thus, the positioning system 1 according to the present embodiment is applied to the service that provides AR content, thereby making it possible to simultaneously display the AR content outside the vehicle and the AR content inside the vehicle when the user is in a vehicle such as a moving bus.

Next, an operation and effects of the positioning system 1 according to the present embodiment will be described.

The positioning system 1 is the positioning system 1 related to positioning of the terminal 50 carried by the user in the vehicle, and includes the first storage unit 11 that stores the global map data 110 in which the feature quantity of the feature point included in the image data outside the vehicle captured in advance is associated with the global position information related to the feature point, and the local map data 111 in which the feature quantity of the feature point included the image data inside the vehicle captured in advance is associated with the local position information related to the feature point; the division unit 52 that divides the image data captured in the terminal 50 into the image area outside the vehicle and the image area inside the vehicle; the global position estimation unit 12 that matching of the feature point of the global map data 110 stored in the first storage unit 11 with the feature point of the image area outside the vehicle, and estimates the global position information related to the image area outside the vehicle on the basis of the global position information related to the feature point of the global map data 110; and the local position estimation unit 13 that performs matching of the feature point of the local map data 111 stored in the first storage unit 11 with the feature point of the image area inside the vehicle, and estimates the local position information related to the image area inside the vehicle on the basis of the local position information related to the feature point of the local map data 111.

In the positioning system 1 according to the present embodiment, the global map data 110 in which the feature quantity of the feature point included in the image data outside the vehicle is associated with the global position information related to the feature point, and the local map data 111 in which the feature quantity of the feature point included the image inside the vehicle is associated with the local position information related to the feature point are stored. In the positioning system 1 according to the present embodiment, the image data captured in the terminal 50 is divided into the image area outside the vehicle and the image area inside the vehicle, matching of the feature point of the global map data 110 with the feature point of the image area outside the vehicle is performed, and matching of the feature point of the local map data 111 with the feature point of the image area inside the vehicle is performed. Thus, the image data is divided into the image area outside the vehicle and the image area inside the vehicle, the global position information is estimated from the global map data 110 for the image area outside the vehicle, and the local position information is estimated from the local map data 111 for the image area inside the vehicle, so that the position information is estimated in association with the respective areas even when both the outside of the vehicle and the inside of the vehicle are imaged and a plurality of self-position recognition results are obtained. This makes it possible to appropriately estimate position information for each area when a plurality of different self-position recognition results can be obtained for the positioning of the terminal 50 carried by the user in the vehicle.

The positioning system 1 further includes the second storage unit 21 that stores the global AR content data 210 in which the global position information outside the vehicle is associated with the AR content, and the local AR content data 211 in which the local position information inside the vehicle is associated with the AR content; and the AR content output unit 22 that specifies the AR content according to the global position information on the basis of the global position information estimated by the global position estimation unit 12 and the global AR content data 210 and outputs the AR content, and specifies the AR content according to the local position information on the basis of the local position information estimated by the local position estimation unit 13 and the local AR content data 211 and outputs the AR content. Thus, the AR content of the global AR content data 210 is output in association for the image area outside the vehicle, and the AR content of the local AR content data 211 is output in association for the image area inside the vehicle, thereby making it possible to display appropriate AR content at an appropriate position for each area of the image.

The positioning system 1 further includes the third storage unit 31 that stores the global space structure data 310 indicating the shape of the object in the space outside the vehicle and local space structure data 311 indicating the shape of the object in the space inside the vehicle, and the AR content output unit 22 determine the display aspect of the AR content according to the global position information in consideration of the shape of the object in the global space structure data 310, and also determine the display aspect of the AR content according to the local position information in consideration of the shape of the object in the local space structure data 311. The display aspect of the AR content is displayed in consideration of a shape of space structure data indicating a shape of an actual object, thereby making it possible to, for example, display the AR content at a position at which the AR content does not overlap with the actual object, or to display AR content along a shape of a specific portion of the actual object. That is, in the positioning system 1, the display aspect of the AR content is determined in consideration of the shape of the object, thereby making it possible to improve, for example, visual recognition of the AR content and provide a more comfortable AR experience to the user. According to such a positioning system 1, because the AR content is immediately visually recognized, a technical effect that efficiency of computer resources related to the visual recognition can be improved is obtained.

The positioning system 1 further includes the moving speed estimation unit 53 that estimates the moving speed of the vehicle, and the global position estimation unit 12 increases the estimation frequency of the global position information as the moving speed estimated by the moving speed estimation unit 53 is faster. When relocalization (re-acquisition of the global position information) is not performed at a high frequency in a case in which the moving speed is high (position change is rapid), there is concern that positioning accuracy may be decreased or AR content that matches actual global position information cannot be displayed (past AR content continues to be displayed). In this respect, the estimation frequency of the global position information is increased as the moving speed becomes higher, thereby making it possible to easily display the AR content that matches the actual global position information even when the moving speed is high, and to provide an AR experience comfortable for the user. Further, according to such a positioning system 1, because processing related to the AR content that does not match the actual global position information becomes unnecessary, a technical effect that a processing load can be reduced, is obtained.

The division unit 52 of the positioning system 1 divides the image data captured in the terminal 50 into the image area outside the vehicle and the image area inside the vehicle only when the moving speed estimated by the moving speed estimation unit 53 is higher than the predetermined division start speed. This makes it possible to perform division processing only when the vehicle starts to move and it is necessary to divide the image area to estimate the global position information and the local position information, and to curb an increase in a calculation amount of the positioning system 1 due to unnecessary division processing when the vehicle does not start to move and there is no need for division (when the moving speed is lower than the predetermined division start speed).

The division unit 52 of the positioning system 1 gives a meaning to each area through semantic segmentation with respect to the image data captured in the terminal 50 and divides the image data into the image area outside the vehicle and the image area inside the vehicle. Thus, the meaning is given to each area through semantic segmentation and the image area is divided on the basis of a result of giving the meaning, thereby making it possible to divide the image area outside the vehicle and the image area inside the vehicle with higher accuracy.

Modification Example

The above description has been given in detail on the basis of the embodiment of the present disclosure. However, the present disclosure is not limited to the above embodiment. The present disclosure can be modified in various ways without departing from the gist of the present disclosure.

The terminal 50 may acquire terminal acquisition position information indicating the position information acquired by the terminal 50, for example, by global positioning system (GPS) positioning. The terminal 50 may transmit the terminal acquisition position information together with the divided image data to the position positioning server 10.

The first storage unit 11 may store a plurality of pieces of divided map data obtained by dividing the global map data 110 into certain areas according to the position information. Areas near a boundary (global position information) may or may not overlap with each other in each piece of divided map data.

The global position estimation unit 12 may estimate the global position information using one or a plurality of pieces of divided map data selected from the plurality of pieces of divided map data. For example, the global position estimation unit 12 may select one or a plurality of pieces of divided map data from a plurality of pieces of divided map data according to the terminal acquisition position information received from the terminal 50, and estimate the global position information at the time of imaging on the basis of a result of matching the feature point of the selected divided map data with the feature point of the image data captured in the terminal 50. The global position estimation unit 12, for example, selects the divided map data including a position indicated in the terminal acquisition position information. Thus, the map data is divided into a plurality of parts according to the global position information, and the divided map data that is a matching target is selected from the plurality of pieces of divided map data according to the terminal acquisition position information, thereby making it possible to appropriately narrow down a matching range (search range), and improve efficiency of the matching processing.

Figure 4:
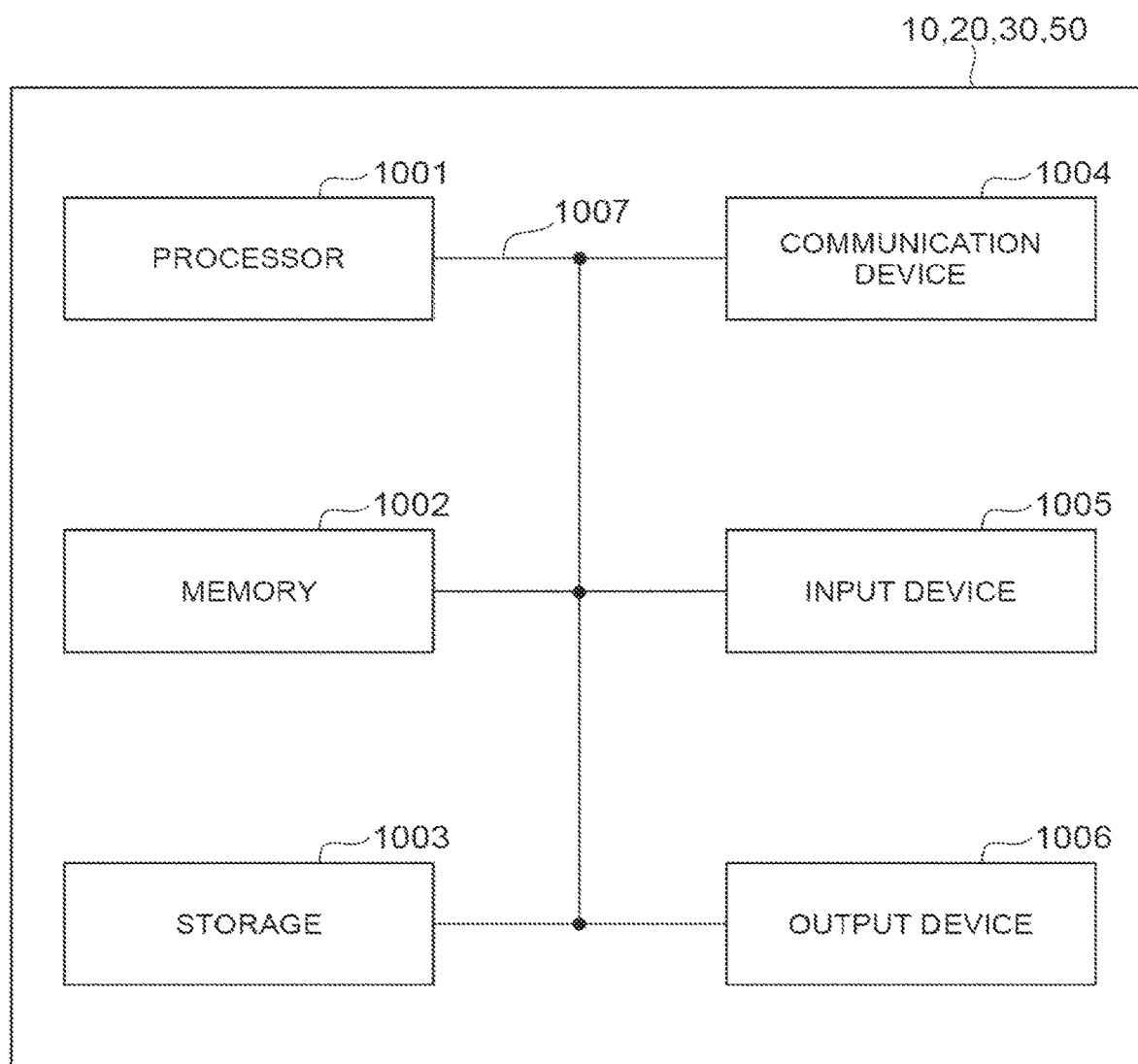
FIG. 4 is a diagram illustrating a hardware configuration of a positioning server, a content server, a space structure server, and a terminal included in the positioning system.

Finally, hardware configurations of the positioning server 10, the content server 20, the space structure server 30, and the terminal 50 included in the positioning system 1 will be described with reference to FIG. 4. The positioning server 10, the content server 20, the space structure server 30, and the terminal 50 may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. A hardware configuration of the positioning server 10, the content server 20, the space structure server 30, and the terminal 50 may be a configuration in which one or a plurality of devices illustrated in the figures are included, or may be a configuration in which some of the devices are not included.

Respective functions in the positioning server 10, the content server 20, the space structure server 30, and the terminal 50 are realized by loading predetermined software (program) onto hardware such as the processor 1001 and the memory 1002 and the processor 1001 performing calculation to control communication using the communication device 1004 or reading and/or writing of data in the memory 1002 and the storage 1003.

The processor 1001, for example, operates an operating system to control the entire computer. The processor 1001 may be configured of a central processing unit (CPU) including an interface with a peripheral device, a control device, a calculation device, a register, and the like. For example, a control function of the global position estimation unit 12 of the position positioning server 10 or the like may be realized by the processor 1001.

Further, the processor 1001 reads a program (program code), a software module, or data from the storage 1003 and/or the communication device 1004 into the memory 1002, and executes various processing according to the program, the software module, or the data. As the program, a program that causes a computer to execute at least some of operations described in the above-described embodiment is used. For example, the control function of the global position estimation unit 12 of the positioning server 10 or the like may be realized by a control program stored in the memory 1002 and operated by the processor 1001 or other functional blocks may be realized in the same manner. Although a case in which the various processing described above are executed by one processor 1001 has been described, the processing may be executed simultaneously or sequentially by two or more processors 1001. The processor 1001 may be mounted on one or more chips. The program may be transmitted from a network via a telecommunication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (program code), a software module, or the like that can be executed to perform a wireless communication method according to an embodiment of the present disclosure.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other appropriate medium.

The communication device 1004 is hardware (a transmission and reception device) for performing communication between computers via a wired network and/or a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, each device such as the processor 1001 and the memory 1002 is connected by the bus 1007 for communicating information. The bus 1007 may be configured by using a single bus, or may be configured by using different buses between devices.

Further, the positioning server 10, the content server 20, the space structure server 30, and the terminal 50 may include hardware such as a microprocessor, a digital signal processor (DSP), an application specific integrated circuit (ASIC), a programmable logic device (PLD), and a field programmable gate array (FPGA), and some or all of respective functional blocks may be realized by the hardware. For example, the processor 1001 may be implemented using at least one of these pieces of hardware.

Although the present embodiment has been described in detail above, it is apparent to those skilled in the art that the present embodiment is not limited to the embodiments described in the present specification. The present embodiment can be implemented as a modified and changed aspect without departing from the spirit and scope of the present invention defined by the description of the claims. Accordingly, the description of the present specification is intended for the purpose of illustration and does not have any restrictive meaning with respect to the present embodiments.

For example, estimation of the global position information that is performed by the global position estimation unit 12 and estimation of the local position information that is performed by the local position estimation unit 13 may be executed in any order or simultaneously (in parallel). Further, the number of estimations may be different and, for example, the estimation of the local position information is performed once each time the estimations of the global position information is performed three times. Further, in the above embodiment, for the sake of description, the positioning server 10, the content server 20, the space structure server 30, and the terminal 50 are described separately, but each processing may be executed by another server or terminal. For example, the division unit 52 may be included in the positioning server 10, the AR content output unit 22 may be included in the terminal 50, or the specifying unit 32 may be included in the terminal 50. The positioning server 10, the content server 20, the space structure server 30, and the terminal 50 may be one server or one terminal.

Each aspect or embodiment described in the present specification may be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, Ultra-Wide Band (UWB), Bluetooth (registered trademark), another system using an appropriate system, and/or a next generation system extended, based on these.

A process procedure, a sequence, a flowchart, and the like in each aspect/embodiment described in the present specification may be in a different order unless inconsistency arises. For example, for the method described in the present specification, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using a wired technology such as a coaxial cable, an optical fiber cable, a twisted pair, or a digital subscriber line (DSL) and a wireless technology such as infrared rays, no cable, or microwaves, the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or any combination of these.

The terms described in the present disclosure and/or terms necessary for understanding of the present specification may be replaced by terms having the same or similar meanings.

Further, information, parameters, and the like described in the present specification may be represented by an absolute value, may be represented by a relative value from a predetermined value, or may be represented by corresponding different information.

A user terminal may be called a mobile terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

The term "determining" used in the present disclosure may include a variety of operations. The "determining" can include, for example, regarding calculating, computing, processing, deriving, investigating, looking up (for example, looking up in a table, a database, or another data structure), or ascertaining as "determining". Further, "determining" can include regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing, or the like as "determining". That is, "determining" can include regarding a certain operation as "determining".

The description "based on" used in the present specification does not mean "based only on" unless otherwise noted. In other words, the description "based on" means both of "based only on" and "at least based on".

When the terms "first", "second", and the like are used in the present specification, any reference to elements thereof does not generally limit an amount or order of those elements. These terms can be used in the present specification as a convenient way to distinguish between two or more elements. Thus, the reference to the first and second elements does not mean that only two elements can be adopted or that the first element has to precede the second element in some way.

When "include", "including" and modifications thereof are used in the present specification or claims, those terms are intended to be comprehensive like the term "comprising". Further, the term "or" used in the present specification or claims is intended not to be an exclusive OR.

In the present specification, it is assumed that a plurality of devices are also included unless a single device is clearly indicated by the context or technically.

In the whole of the present disclosure, it is assumed that a plurality of things are included unless it is cleared from the context that a singular thing is indicated.

REFERENCE SIGNS LIST

1 Positioning system
11 First storage unit
110 Global map data
111 Local map data
12 Global position estimation unit
13 Local position estimation unit
21 Second storage unit
210 Global AR content Data
211 Local AR content data
22 AR content output unit
31 Third storage unit
310 Global space structure data
311 Local space structure data
50 Terminal
52 Division unit
53 Moving speed estimation unit

The invention claimed is:

1. A positioning system related to positioning of a terminal carried by a user in a vehicle, the positioning system comprising processing circuitry configured to:
store global map data in which a feature quantity of a feature point included in image data outside a vehicle captured in advance is associated with global position information related to the feature point, and local map data in which a feature quantity of a feature point included in image data inside the vehicle captured in advance is associated with local position information related to the feature point;
divide image data captured in the terminal into an image area outside the vehicle and an image area inside the vehicle;
perform matching of the feature point of the global map data stored in the first storage unit with the feature point of the image area outside the vehicle, and estimate global position information related to the image area outside the vehicle on the basis of the global position information related to the feature point of the global map data;
perform matching of the feature point of the local map data stored in the first storage unit with the feature point of the image area inside the vehicle, and estimate local position information related to the image area inside the vehicle on the basis of the local position information related to the feature point of the local map data,
store global AR content data in which the global position information outside the vehicle is associated with AR content, and local AR content data in which local position information inside the vehicle is associated with the AR content;
store global space structure data indicating a shape of an object in a space outside the vehicle and local space structure data indicating a shape of an object in a space inside the vehicle;
specify a first AR content according to the global position information on the basis of the global position information and the global AR content data, determine a display position of the first AR content based on the global position information and the global space structure data, and output the first AR content; and specify a second AR content according to the local position information on the basis of the local position information and the local AR content data, determine a display position of the second AR content based on the local position information and the local space structure data, and output the second AR content.

2. The positioning system according to claim 1,
wherein the processing circuitry determines the display position of the AR content according to the global position information in consideration of the shape of the object in the global space structure data, and also determines the display position of the AR content according to the local position information in consideration of the shape of the object in the local space structure data.

3. The positioning system according to claim 1
wherein the processing circuitry is further configured to estimate a moving speed of the vehicle, and
increase an estimation frequency of the global position information as the estimated moving speed is faster.

4. The positioning system according to claim 3, wherein the processing circuitry divides the image data captured by the terminal into an image area outside the vehicle and an image area inside the vehicle only when the estimated moving speed is higher than a predetermined division start speed.

5. The positioning system according to claim 1, wherein the processing circuitry gives a meaning to each area through semantic segmentation with respect to the image data captured in the terminal and divides the image data into the image area outside the vehicle and the image area inside the vehicle.

6. The positioning system according to claim 2, further comprising:
wherein the processing circuitry is further configured to estimate a moving speed of the vehicle, and
increase an estimation frequency of the global position information as the estimated moving speed is faster.

7. The positioning system according to claim 2,
wherein the processing circuitry gives a meaning to each area through semantic segmentation with respect to the image data captured in the terminal and divides the image data into the image area outside the vehicle and the image area inside the vehicle.

8. The positioning system according to claim 3, wherein the processing circuitry gives a meaning to each area through semantic segmentation with respect to the image data captured in the terminal and divides the image data into the image area outside the vehicle and the image area inside the vehicle.

9. The positioning system according to claim 4, wherein the processing circuitry gives a meaning to each area through semantic segmentation with respect to the image data captured in the terminal and divides the image data into the image area outside the vehicle and the image area inside the vehicle.

10. A method, implemented by processing circuitry of a positioning system related to positioning of a terminal carried by a user in a vehicle, the method comprising:

storing global map data in which a feature quantity of a feature point included in image data outside a vehicle captured in advance is associated with global position information related to the feature point, and local map data in which a feature quantity of a feature point included in image data inside the vehicle captured in advance is associated with local position information related to the feature point;

dividing image data captured in the terminal into an image area outside the vehicle and an image area inside the vehicle;

performing matching of the feature point of the global map data stored in the first storage unit with the feature point of the image area outside the vehicle, and estimating global position information related to the image area outside the vehicle on the basis of the global position information related to the feature point of the global map data; and performing matching of the feature point of the local map data stored in the first storage unit with the feature point of the image area inside the vehicle, and estimating local position information related to the image area inside the vehicle on the basis of the local position information related to the feature point of the local map data, storing global AR content data in which the global position information outside the vehicle is associated with AR content, and local AR content data in which local position information inside the vehicle is associated with the AR content;

storing global space structure data indicating a shape of an object in a space outside the vehicle and local space structure data indicating a shape of an object in a space inside the vehicle;

specifying a first AR content according to the global position information on the basis of the global position information and the global AR content data, determining a display position of the first AR content based on the global position information and the global space structure data, and outputting the first AR content; and specifying a second AR content according to the local position information on the basis of the local position information and the local AR content data, determining a display position of the second AR content based on the local position information and the local space structure data, and outputting the second AR content.

* * * * *